United States Patent [19]

Bishop

[11] 4,005,964
[45] Feb. 1, 1977

[54] INJECTION-MOLD CLAMPING UNIT HAVING ALTERNATELY EJECTING DIE ASSEMBLIES

[75] Inventor: Thomas G. Bishop, Mount Gilead, Ohio

[73] Assignee: Koehring Company, Milwaukee, Wis.

[22] Filed: Feb. 10, 1975

[21] Appl. No.: 548,768

Related U.S. Application Data

[62] Division of Ser. No. 372,955, June 25, 1973, Pat. No. 3,898,030.

[52] U.S. Cl. .......................... 425/242 R; 425/190; 425/451.9; 425/DIG. 221
[51] Int. Cl.² ........................................ B29F 1/022
[58] Field of Search ............... 164/130, 332; 425/DIG. 221, DIG. 223, 450.1, 451.2, 451.9, 190, 183, 242, 247, 233, 234; 264/328, 297

[56] References Cited

UNITED STATES PATENTS

| | | | |
|---|---|---|---|
| 3,353,221 | 11/1967 | Barnett et al. | 425/451.9 |
| 3,707,342 | 12/1972 | Lohmann | 425/450.1 |
| 3,898,030 | 8/1975 | Bishop | 425/450.1 |

FOREIGN PATENTS OR APPLICATIONS 47-14506   1/1972   Japan .................. 425/247

Primary Examiner—Francis S. Husar
Assistant Examiner—Carl Rowold
Attorney, Agent, or Firm—Burns, Doane, Swecker & Mathis

[57] ABSTRACT

An injection mold includes a stationary platen carrying a pair of stationary die sections, a movable platen carrying a pair of movable die sections, and a pair of floating die sections disposed between the movable and stationary die sections. The respective floating and stationary die sections are mutually configured to define a pair of die cavities which are arranged for alternate communication with an injector unit. The floating die sections are selectively connectable to their associated movable and stationary die sections to expose one of the die cavities for article ejection, while maintaining the other die cavity closed for continuing a curing stage.

17 Claims, 14 Drawing Figures

INJECTION-MOLD CLAMPING UNIT HAVING ALTERNATELY EJECTING DIE ASSEMBLIES

This is a division of application Ser. No. 372,955, filed June 25, 1973, now U.S. Pat. No. 3,898,030.

BACKGROUND AND OBJECTS OF THE INVENTION

This invention relates to article molding, particularly wherein plasticated material is injected into a die cavity and allowed to cure to a desired degree before being removed.

Injection molding techniques for forming plastic and rubber articles are well known. One such technique utilizes a clamping unit having a stationary die section and a movable die section. Opposing faces of these die sections are configured to define a die cavity when the sections are in abutting relationship. The stationary die section is provided with a sprue opening which communicates the interior of the die cavity with an injector unit capable of injecting a charge of plasticated substance into the die cavity.

A suitable type of injector unit may be of the reciprocal screw type. In such a unit, a screw is rotated within a barrel to melt and mix a predetermined charge of material, such as plastic or rubber for example. Subsequently, the screw is reciprocated, in the manner of a piston, to ram or "shoot" this charge through the sprue and into the die cavity.

Extremely high pressures are produced by such an injection operation. To resist these pressures, a heavy-duty clamping unit is provided to urge the die sections into tight interengagement. In many instances, the amount of counterforce or "clamp tonnage" necessary to maintain the die sections closed may be on the order of at least 20,000 psi, thus requiring the use of clamps of substantial size.

After being injected into the die cavity, the plasticated charge solidifies and may be subjected to a curing stage. Following this, the die sections are separated, and the molded article is suitably ejected.

While such apparatus is capable of producing articles of high quality, the quantity of articles which may be produced thereby is somewhat restricted, due mainly to the inactivity of the apparatus during the curing stage. The extent of this inactivity varies somewhat, depending upon the type of articles being molded. For example, in the production of large automobile body or bumper components, from synthetic rubber material, the period of inactivity may last for six minutes or more, during which time only a single article is being produced.

An effort to increase production, as by mounting a plurality of die pair on the platens to be injected simultaneously and cured simultaneously, would require the use of a larger injector in order to produce a sufficiently large charge for injecting two die cavities simultaneously. Moreover, the injection pressures required to be resisted by the clamp during this simultaneous injection would increase substantially, thereby requiring the use of much larger clamping apparatus.

It is, therefore, a general object of the invention to provide novel methods and apparatus for obviating or minimizing problems of the sort previously noted.

It is a particular object of the invention to provide such novel methods and apparatus which maximize the production rate of an injection-mold clamping unit while minimizing the required clamp tonnage.

It is another object of the invention to provide such novel methods and apparatus which maximize the production rate of an injection-mold clamping unit while minimizing the required clamp tonnage and injector capacity.

It is yet another object of the invention to provide such novel methods and apparatus which enable a charge to cure in the clamp unit simultaneously with the ejection of a cured charge therefrom.

BRIEF SUMMARY OF A PREFERRED EMBODIMENT

A preferred form of the invention intended to accomplish at least some of the foregoing objects entails an injection-mold clamping unit having a plurality of die assemblies. Each die assembly includes a pair of die sections configured to define a die cavity when urged together. Locking mechanism is provided to lock together the die sections of one die assembly while the die sections of the other die assembly are being separated. Conversely, locking mechanism is provided to lock together the die sections of another die section while the die sections of another die assembly are being separated.

More particularly, the clamping unit comprises stationary and movable platens. Actuating mechanism is provided for shifting the movable platen toward and away from the stationary platen. A pair of die assemblies are provided, each of which a stationary die section carried by the stationary platen, and a floating die section disposed intermediate the movable and stationary die sections. The floating and stationary die sections of each die assembly have opposed faces which are mutually configured to define a die cavity when in abutting relationship. Coupling mechanisms are mounted on the die assemblies and are operable to couple each floating die section with a selective one of its associated movable and stationary die sections.

The stationary die sections are provided with sprue openings which communicate the die cavities with a material-injecting apparatus, preferably an injector unit of the reciprocal screw type. Communication of the die cavities with the injector is alternated such that the die cavities may be injected independently at staggered intervals.

In a method aspect of the invention, the die assemblies are operated in a out-of-phase relationship. Thus, with the clamp closed, the injector injects melt into the die cavity of a first of the die assemblies, while previously-injected melt cures in the die cavity of a second of the die assemblies.

When curing of the latter is complete, accomplished to a desired degree, the clamp is opened, with the floating and movable die sections of the second die assembly being coupled together, to expose the die cavity thereof. The molded article is ejected therefrom. During this procedure, the floating and stationary die sections of the first die assembly are maintained in coupled relationship to enable the melt therein to cure.

Subsequent closing of the clamp enables the second die cavity, now empty, to be injected with a new charge of melt.

When the melt in the first die cavity has cured to a desired degree, the clamp is opened, with the floating and movable die sections of the first die assembly being coupled to expose the molded article for ejection. Simultaneously, the floating and stationary die sections of the second die assembly are coupled together to enable the melt therein to cure.

In this fashion, the production rate of the clamp is maximized, while the tonnage requirements of the clamp and the size of the charge required to be produced by the injector are minimized.

THE DRAWING

Other objects and advantages of the present invention will become apparent from the subsequent detailed description thereof in connection with the accompanying drawing in which like numerals designate like elements, and in which.

DETAILED DESCRIPTION OF THE PREFERRED EMBODIMENT

Figure 1:
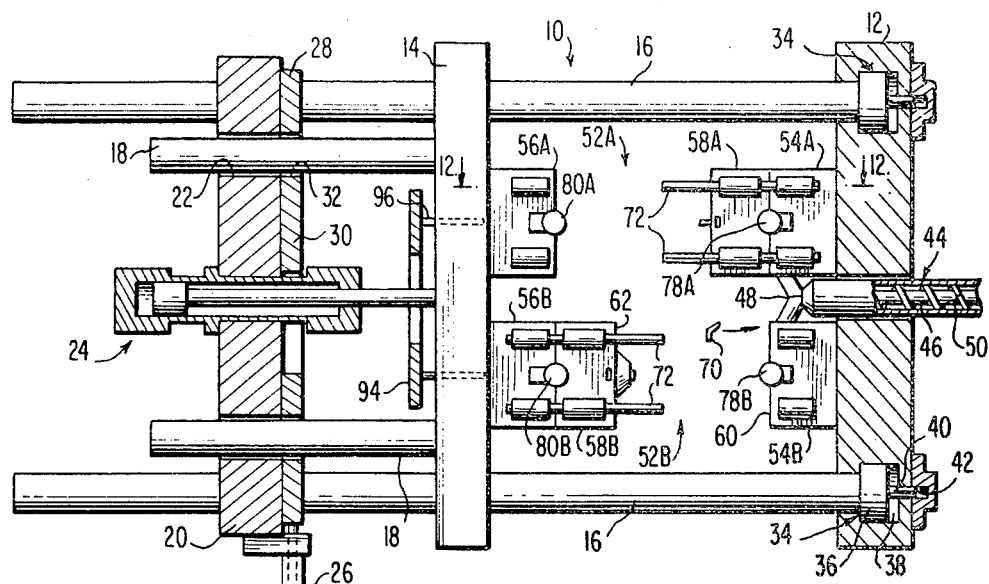
FIG. 1 is a side elevational view, partly in longitudinal section, of an injection-mold clamping unit, according to the invention, in one stage of its operational cycle.

Referred to FIG. 1, a preferred form of an injection-mold clamping unit 10 comprises a stationary frame or platen 12 and a movable frame or platen 14. The movable platen 14 is slidably mounted on a plurality of strain rods 16, preferably four in number, which project outwardly from the stationary platen 12.

Projecting rearwardly from the movable platen 14 are a plurality of compression columns 18, the function of which is to be subsequently described.

Adjacent their outer ends, the strain rods fixedly carry a back plate 20 having openings 22 which accommodate sliding movement of the compression columns 18 therethrough.

Mounted on the back plate 20 is a fluid-actuated traverse cylinder 24, the rod end of which is attached to the movable platen 14. Extension of the traverse cylinder 24 causes the movable platen 14 to be shifted toward the stationary platen 12.

Figure 3:
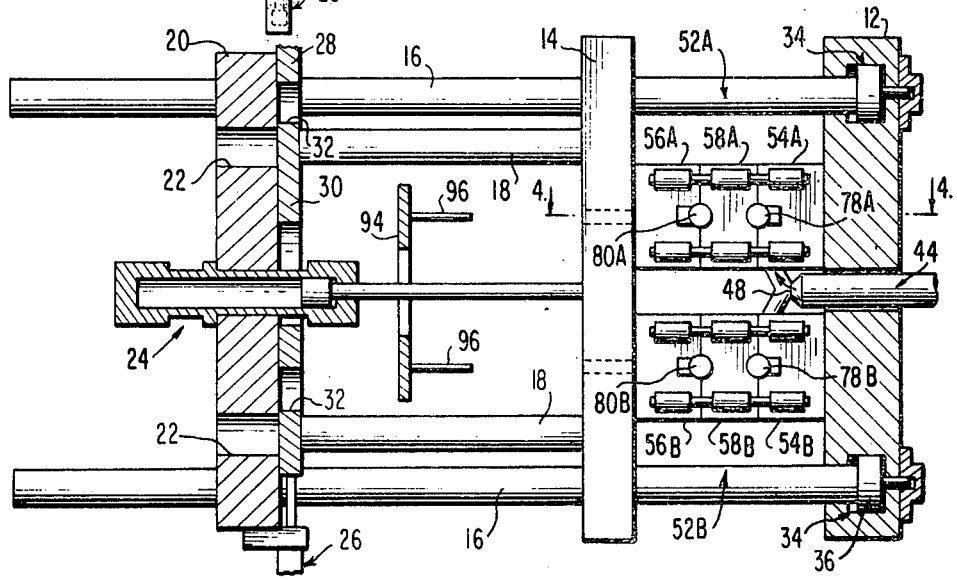
Figure 4:
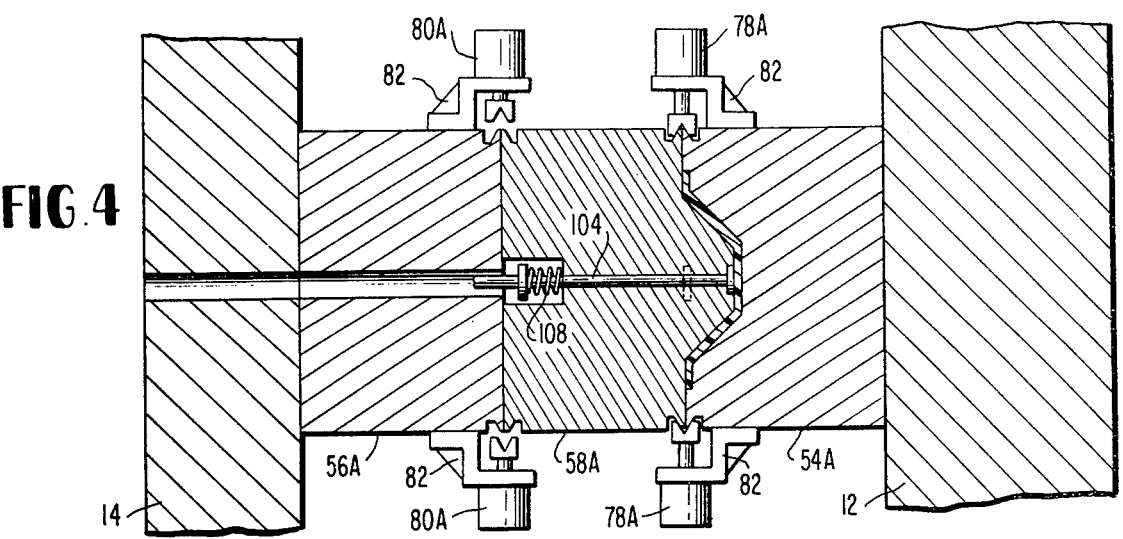
FIG. 4 is a longitudinal sectional view of a die assembly taken along line 4—4 of FIG. 3.

The back plate 20 has mounted thereon a fluid-actuated lock cylinder 26, the rod end of which carries a lock plate 28. The lock plate 28 includes a pair of locking legs 30 which straddle the traverse cylinder 24. Disposed in each of the locking legs 30 are a pair of apertures 32 which may be selectively aligned with the openings 22 in the back plate 20. The lock cylinder 26 is operable to slide the lock plate 28 between a column-unlock position and a column-lock position. In the column-unlock position, the apertures 32 are aligned with the openings 22 to accommodate sliding movement of the compression columns 18 (FIG. 1). In the column-lock position, the locking legs 30 are disposed to cover the openings 22 (FIG. 3).

Each strain rod 16 is movably mounted relative to the stationary platen 12. A power mechanism is provided to exert clamping leverage to hold the die cavities closed. A preferred form of power mechanism comprises a fluid-actuated main clamping cylinder 34, the piston 36 of which being integral with its associated strain rod. Each of the pistons 36 is slidably disposed within a chamber 38 in the stationary platen 12. Pressurized fluid may be fed to the rod side of this main clamping cylinder to retract the strain rods 16 in a manner shifting the back plate 20 toward the stationary platen 12.

Conversely, when pressurized fluid is supplied to the piston side of the main clamping cylinders, the strain rods 16 will be extended to shift the back plate 20 away from the stationary platen 12. In this connection, it is desired that pressurized fluid fed to the piston end of the main clamping cylinder be supplied to an auxiliary or break-away cylinder 40 which is mounted on the piston 36. This break-away cylinder 40 is reciprocally mounted in an auxiliary chamber 42 which is considerably smaller than the chamber 38.

Operably associated with the clamp is an injector unit for supplying a charge of plasticated material, such as rubber or plastic for example.

One suitable form of injector 44 is of the reciprocal screw type. Such injector 44 typically includes a barrel 46 having a discharge orifice 48 at one end thereof and a plasticator screw 50 rotatably and reciprocally mounted in the barrel 46. Motors for rotating and reciprocating the screw within the barrel (not shown) are also provided in the usual manner.

In operation, forward rotation of the screw 50 causes plastic or rubber stock material within the barrel to be advanced and melted in a known fashion. With the discharge orifice being blocked by a conventional blocking device, the plasticated material, or melt, tends to accumulate at the tip of the barrel, and the screw 50 is rearwardly displaced within the barrel 46. After the screw 50 has receded by a predetermined distance, the orifice 48 is unblocked and the screw is reciprocated forwardly to ram the melt through the orifice and into die portions of the clamp.

The main clamping cylinders 34 are designed to resist the injection pressures imposed on the clamp during this melt-ramming operation.

As described to this point, the clamping unit comprises conventional elements capable of operating in a known manner. Heretofore, the stationary and movable platens have each been provided with a single die section, which together define a die cavity when in abutting relationship. With the clamp closed, melt is injected into the die cavity. Subsequently, the die sections are held tightly shut while the melt cures. During this time, the injector is operated to prepare another charge of melt. In many instances, a fresh charge is prepared well prior to the end of the curing stage. However, the initiation of a subsequent injection operation must be delayed until the melt has cured to a desired degree.

In accordance with this invention, however, a plurality of die assemblies are provided which enable the clamp and extruder to be utilized in the production of a second article, while the initially-injected charge cures.

Although any suitable number of die assemblies may be employed in conjunction with the clamp, the preferred embodiment utilizes a pair of side-by-side die assemblies 52A and 52B. If so desired, however, the die assemblies could be vertically superposed.

The die assemblies 52A, B, include stationary die sections 54A and 54B, movable die sections 56A and 56B, and floating die sections 58A and 58B.

Figure 7:
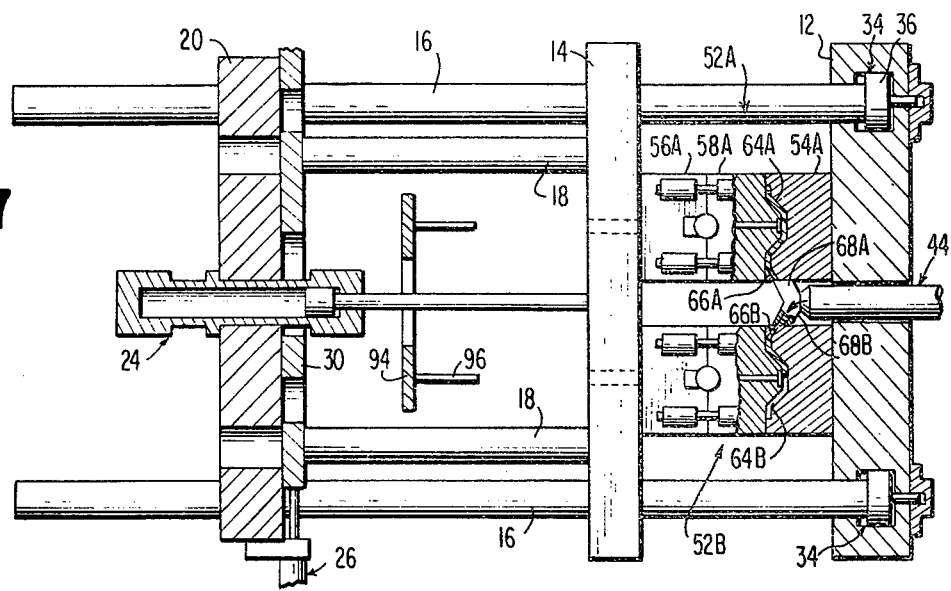

The stationary die sections 54A, B are fixedly secured to the stationary platen 12. Opposing or proximate faces 60 and 62 of the stationary and floating die sections are mutually configured to define die or mold cavities 64A and 64B there between (FIG. 7). These die cavities are shaped in accordance with the desired configuration of articles intended to be produced thereby. Sprue channels 66A and 66B are provided in the stationary die sections 54A, B. These sprue channels are arranged to communicate the die cavities 64A, B with the extruder 44, via channels 68A and 68B.

Suitable mechanism is provided for initially directing melt from the injector 44 to one of the die cavities 64A, B. Preferably, this mechanism is in the form of a sprue plug 70 which is configured to seat within and block a sprue opening (FIG. 1). In this fashion, when the plug 70 is inserted within the sprue opening of one of the die cavities, the flow of melt thereto will be blocked and diverted to the other die cavity.

If desired, however, a suitable valving arrangement could be employed in the passages 68A, B, in lieu of the plug 70, to selectively divert the melt flow.

The movable die sections 56A, B are fixedly secured to the moving platen 14 for reciprocal movement there with toward and away from the associated stationary die sections 54A, B.

Figure 12:
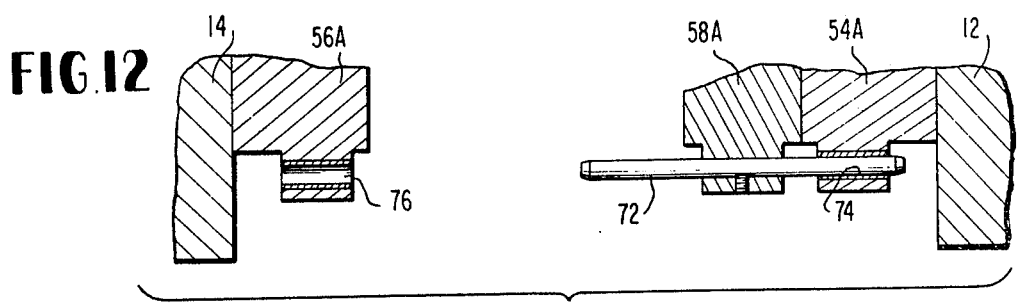
FIG. 12 is a longitudinal sectional view of a portion of a die assembly, taken along line 12—12 of FIG. 1.

The floating die sections 58A, B are disposed between the stationary and movable die sections. Preferably, these floating die sections each include a plurality of guide pins 72 which project toward aligned recesses 74 and 76 carried by the associated stationary and movable die sections (FIG. 12.)

Figure 13:
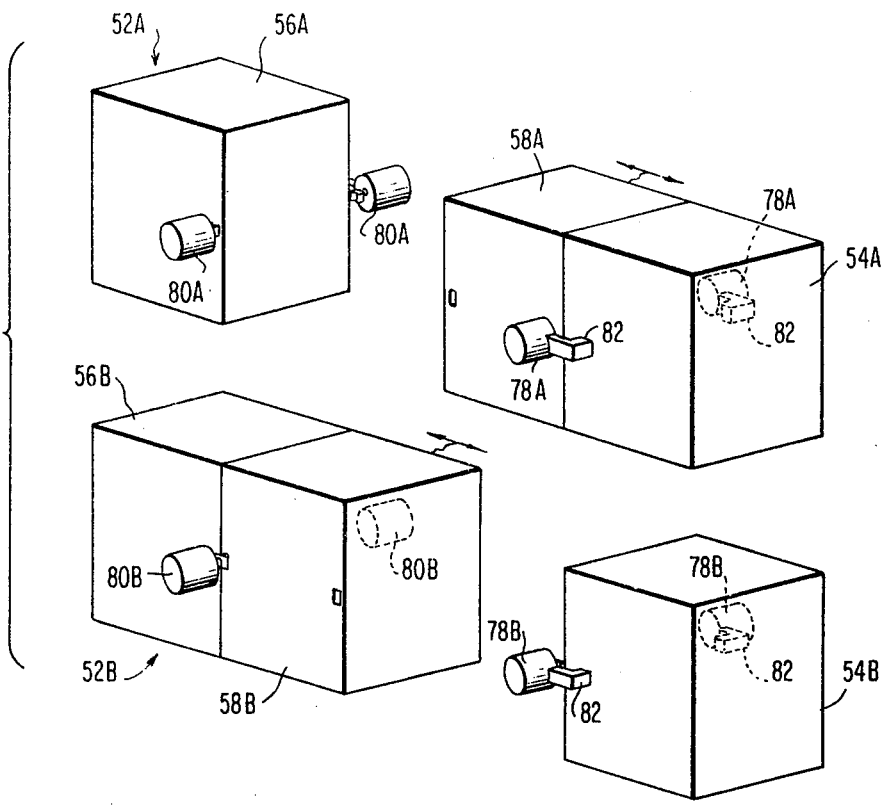
FIG. 13 is a schematic illustration, in perspective, of a pair of die assemblies in accordance with one stage of clamp operation.
Figure 14:
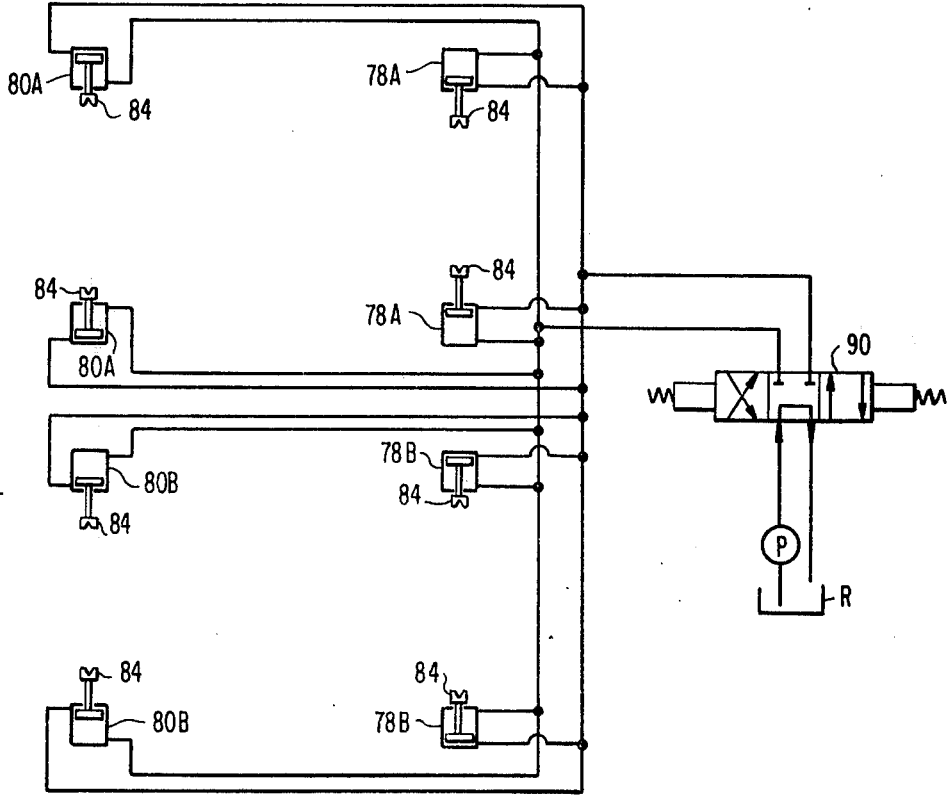
FIG. 14 is a schematic view of a fluid circuit for actuating coupling cylinders of the clamping unit.

The floating die sections 58A, B are arranged to be alternately coupled to their associated movable and stationary die sections 54A, B and 56A, B. Suitable apparatus for accomplishing this comprises fluid-actuated coupling cylinders 78A, 78B, 80A, and 80B (FIGS. 1, 13, and 14). These coupling cylinders are preferably mounted on the stationary and movable die sections by means of suitable brackets 82 (FIG 9), although they could be attached to the floating die sections if so desired.

Each coupling cylinder includes a locking dog 84 carried at the end of the rod portion of the cylinder. Each locking dog has a tapered recess 86 which is engagable with lugs 88 situated on opposite sides of each of the die sections. The tapered recesses of the locking dogs are operable to engage converging surfaces of these lugs when the die sections are disposed in abutting relationship. The wedge-like configuration of the recesses 86 enables the coupling cylinders to hold their associated die sections in tight interengagement when the cylinders are in a coupling position.

By alternately actuating the coupling cylinders associated with each of the die assemblies 52A, B, the floating die sections 58A, B may be sequentially couples to their associated stationary and movable die sections 54A, B, and 56A, B. A hydraulic fluid circuit such as that depicted in FIG. 14, is preferably utilized for this purpose. This circuit includes a pump P for supplying hydraulic fluid under pressure from a reservoir R. A sleeve valve 90 is provided and is selectively actuable to conduct pressurized fluid to the piston sides of either the set of 78A and 80B or the set of coupling cylinders 80A and 78B to extend the locking dogs 84 thereof. Simultaneously, the valve directs pressurized fluid to the rod ends of the other set of coupling cylinders to retract the locking dogs associated therewith.

By coupling together the movable and floating die sections, the die cavities associated therewith may be exposed by withdrawing the movable platen 14 from the stationary platen 12. In this fashion a cured article disposed in the cavity may be displaced therefrom.

An article-ejecting mechanism is desirably employed to displace cured articles.

Figure 9:
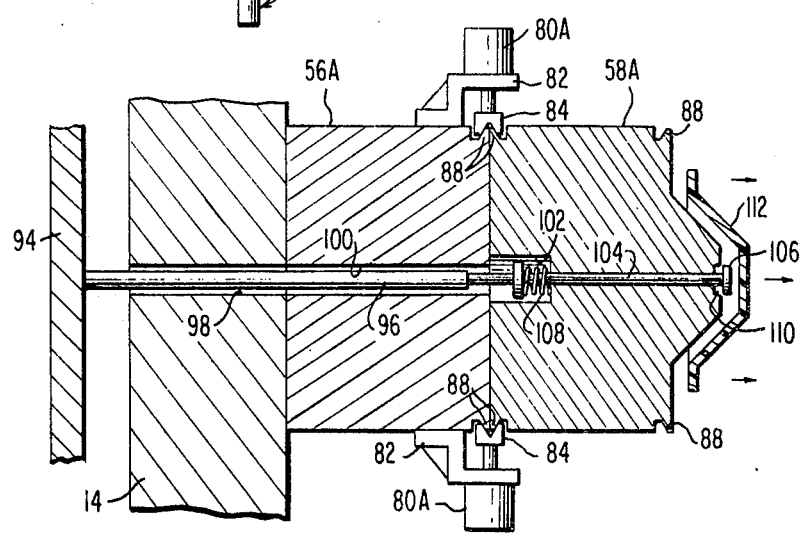
FIG. 9 is a longitudinal sectional view of a portion of a die assembly during an ejecting stage, taken along line 9—9 of FIG. 8.

One suitable form of article-ejecting mechanism, shown particularly in FIG. 9, comprises a stationary plate 94 which is fixedly secured to the clamp in any suitable manner (not shown). Preferably, the stationary plate 94 is located between the movable platen 14 and the back plate 20. A plurality of ejector pins 96 project forwardly from the stationary plate 94. These ejector pins 96 are aligned with apertures 98, 100 and 102 located in the movable platen 12, the movable die sections 56A, B, and the floating die sections 58A, B.

Within each aperture 102 of the floating die sections 58A, B is slidably disposed a push-out rod 104. These rods 104 extend through the floating die sections and terminate in enlarged head portions 106. The rods 104 are biased rearwardly by compression springs 108 to a position in which the head portions 106 are seated within recesses 110 of the floating die sections so as to be contiguous with the outer faces of the floating die sections.

When the movable platen 12 is shifted toward the stationary plate 94, the ejector pins 96 pass through the apertures 98 and 100 and depress the rod 104 forwardly to eject cured articles 112 adhering to the floating die sections.

OPERATION

According to the invention, the die assemblies 52A and 52B are operated in a out-of-phase relationship. A molding operation may be initiated by shifting the sleeve valve 90 to a position in which pressurized fluid is delivered to the piston ends of the coupling cylinders 78A and 80B and the rod ends of the coupling cylinders 78B and 80A (See FIG. 14). Consequently, the locking dogs 84 carried by the cylinders 78A and 80B will be extended to couple together the floating and stationary die sections 54A and 58A of the die assembly 52A, as well as the floating and movable die sections 58B and 56B of the die assembly 52B.

Subsequent retraction of the traversing cylinder 24 will separate the floating and stationary die sections 58B and 54B, thereby exposing the die cavity 64B (See FIG. 1). In this position, the floating die section 58B is effectively carried by the movable die section 56B by means of the guide pins 72 which are disposed in the apertures 76 of the movable die section 56B.

The plug 70 is inserted into the sprue opening 66B to block communication between the die cavity 64B and the injector unit 44.

Figure 2:
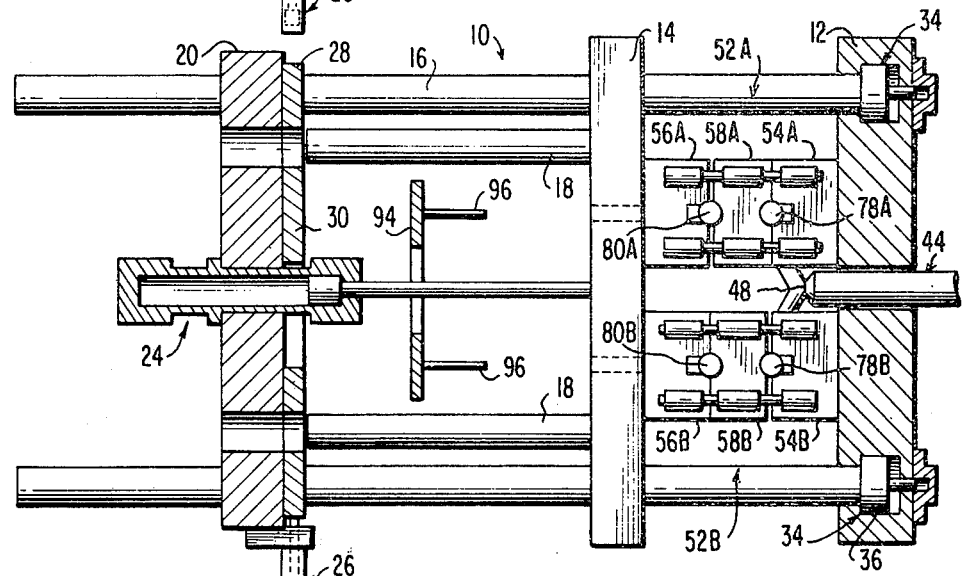
FIGS. 2 and 3 are views similar to that of FIG. 1 depicting the clamping unit in other stages of operation.

At this point, the traversing cylinder 24 is extended to its full extent to shift the movable platen 14 toward the stationary platen 12 (See FIG. 2). In this fashion, the floating and stationary die sections 58B and 54B of the die assembly 52B are brought into closely adjoining relationship, i.e., within a fraction of an inch of closing the die cavity 64A.

At this stage of operation, the ends of the compression columns 18 will be spaced sufficiently from the lock plate 28 to enable the lock cylinder 26 to slide the locking legs 30 to a position wherein they cover the openings 22 (See FIG. 3).

Pressurized fluid is subsequently delivered to the main clamping cylinders 34 to shift the strain rods 16, the back plate 20, and the lock plate 28 toward the stationary platen 12. As a result the legs 30 of the lock plate 28 engage the ends of the compression columns 18 and forcefully urging the floating die sections 58A, B tightly against the stationary die sections 54A, B to develop tonnage.

During the foregoing procedure, the injector 44 has functioned to prepare a charge of melt. Accordingly, when the main clamping cylinders 34 have been actuated to firmly clamp the floating and stationary die sections, the screw 50 is reciprocated forwardly within the barrel 46 to inject the melt through the orifice 48. Since the sprue 66B is blocked by the plug 70, the melt will be diverted through the sprue 66A and into the die cavity 64A. The injection forces produced by this operation are effectively resisted by the clamp tonnage imparted to the die assemblies by the main clamping cylinders 34. When the die cavity 64A has been filled with melt, the orifice 48 is blocked and the melt begins a curing stage. The injector 44 is immediately actuated to produce a fresh charge of melt.

Figure 5:
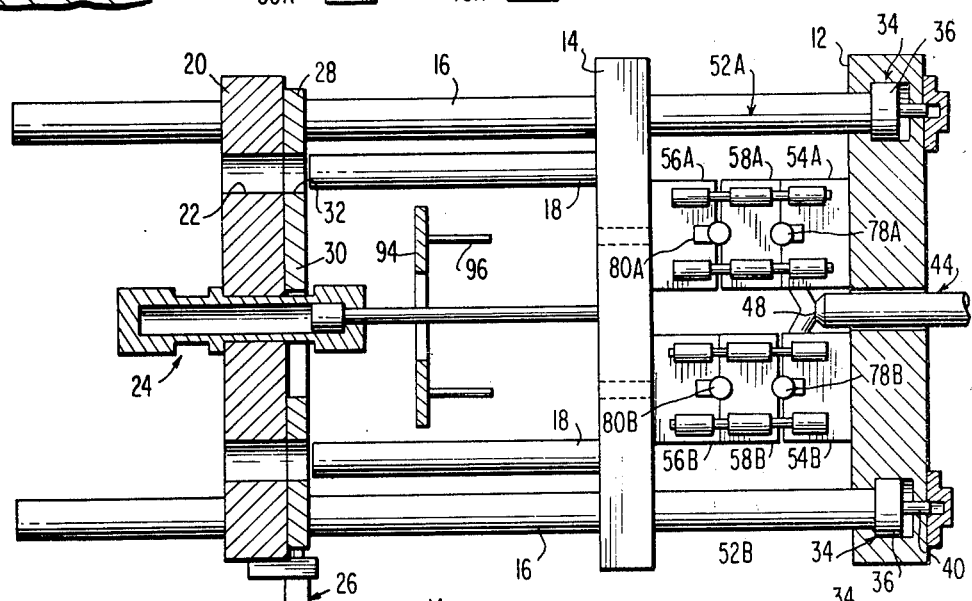
FIGS. 5 through 8 are views similiar to that of FIG. 1 depicting further operational stages of the clamping unit.
Figure 6:
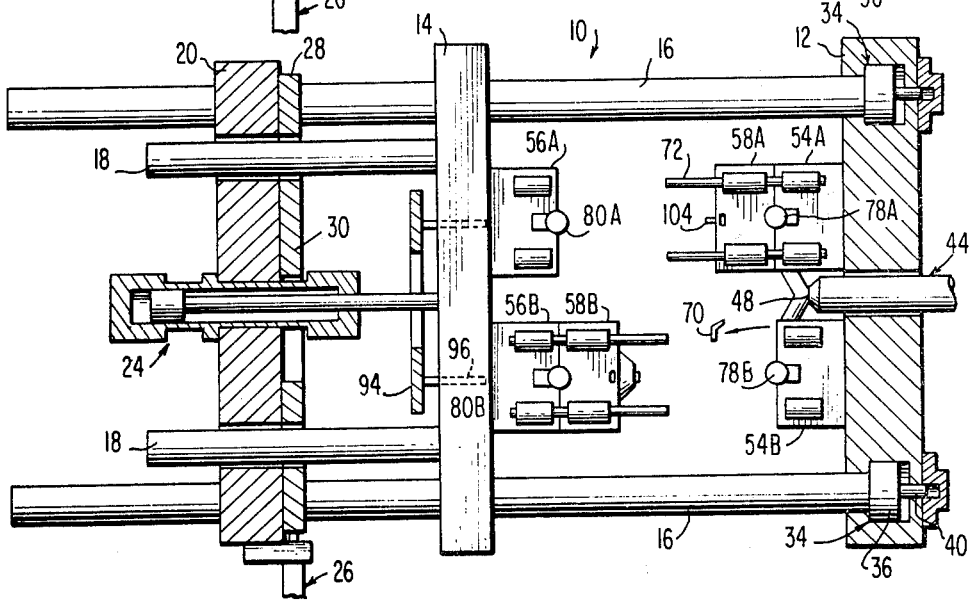

While the fresh charge is being prepared, pressurized fluid is fed to the break-away cylinders 40 to initially separate the floating die section 58B from the stationary die section 54B (See FIG. 5). Subsequently, the lock cylinder 26 is actuated to slide the lock plate 28 to realign the apertures 32 and the openings 22. The traversing cylinder 24 is then retracted to fully withdraw the floating die section 58B from the stationary die section 54B (See FIG. 6). The plug 70 is now removed from the sprue 66B.

During this clamp-opening procedure, the floating die section 58A and the stationary die section 54A have been maintained in tight abutting relationship, since they are held together by the locking dogs 44 of the coupling cylinders 78A. Thus, despite the fact that the clamp is in an open condition, material within the die cavity 64A continues to cure.

With the plug 70 now removed the sprue 66B, the traversing cylinder 24, the lock cylinder 26, and the main clamping cylinders 34 are sequentially actuated to close the clamp 10 (See FIG. 7). When a fresh charge of melt is prepared by the injector, the screw 50 is reciprocated forwardly to inject the melt into the die cavity 64B, the cavity 64A being occupied by the melt curing therein. Upon completion of this injection step, the orifice 48 is closed and the melt within the die cavity 64B begins to cure.

The clamp 10 is maintained in a closed position until the melt disposed in the die cavity 64A has cured to the desired degree. At this point, the floating die section 58A may be separated from the stationary die section 54A to expose the molded article. Subsequent to the reclosing of the clamp and prior to the separation of the floating and stationary die sections 58A and 54A, the spool valve 90 is shifted to communicate the pump P with the piston ends of the coupling cylinder 80A and 78B. In this fashion, the floating die section 58A will be coupled to the movable die section 56A, and the floating die section 58B will be coupled to the stationary die section 54B.

Figure 8:
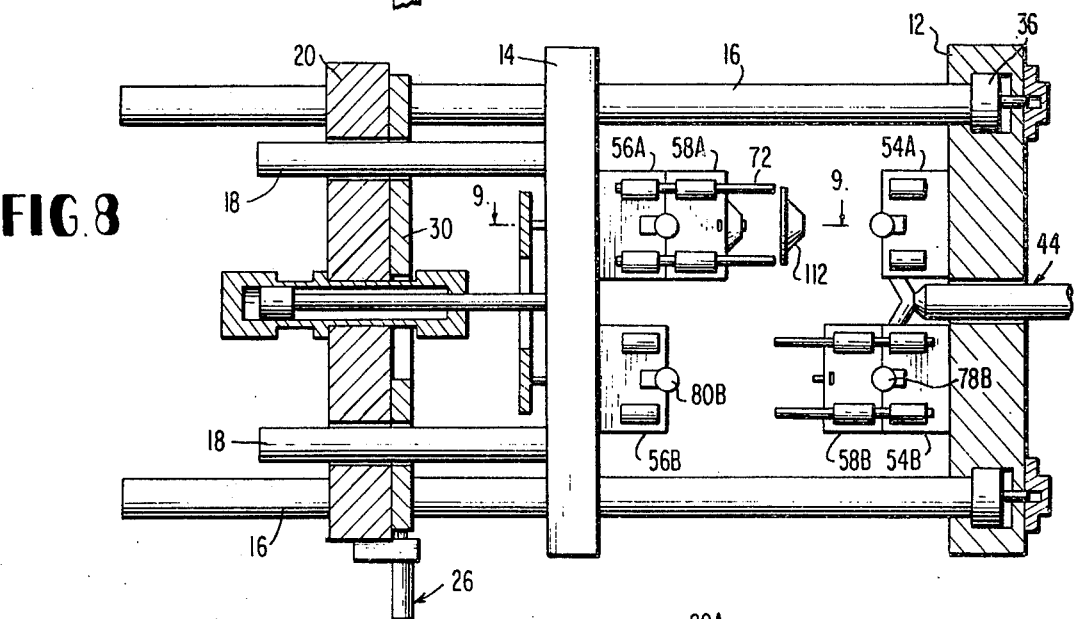

The clamp is now opened by initially directing pressurized fluid to the break-away cylinders 40. This produces sufficient break-away tonnage to release the forces on the compression columns 18. The lock cylinder 26 is now actuated to realign the apertures 32 with the openings 22, and the traversing cylinder 24 is retracted to fully withdraw the floating die section 58A from the stationary die section 54A (See FIG 8).

When the movable platen 12 reaches its fully withdrawn position, the ejector pins 26 will enter the apertures 98 and 100 and will depress the ejector rods 104, as shown in FIG. 9. As a result, the enlarged head portions 106 of the rods 104 will displace the cured article 112 from the floating die section 58A.

During the reopening of the clamp 10, the floating and stationary die sections 58B and 54B are held together by the coupling cylinders 58B to enable the melt disposed within the die cavity 64B to cure.

The clamp is now closed by suitable actuation of the traversing cylinder 24, the lock cylinder 26, and the main clamping cylinders 34.

Figure 10:
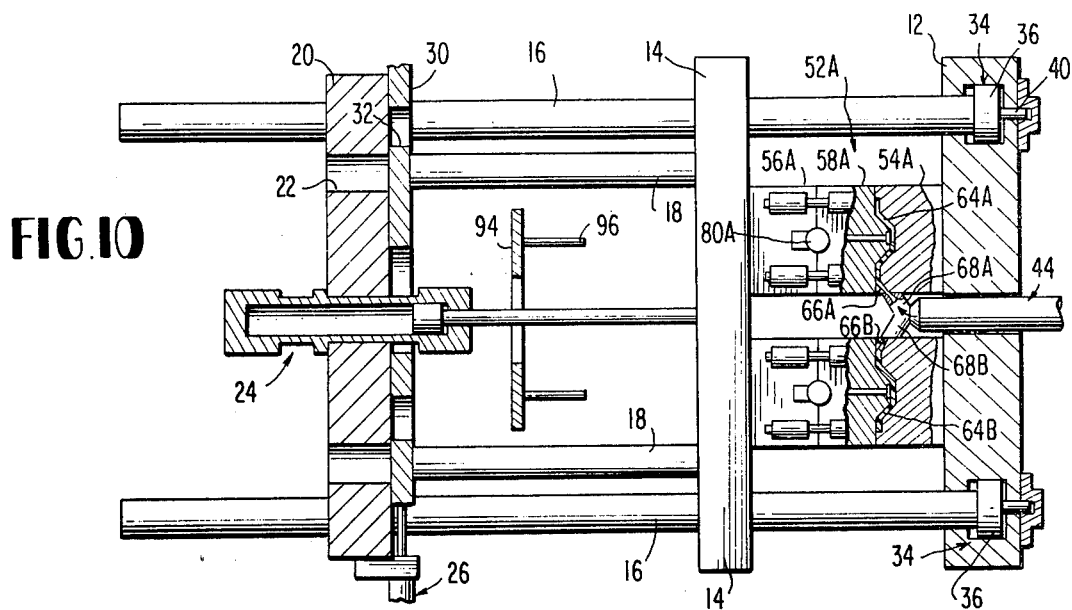
FIGS. 10 and 11 are views similar to that of FIG. 1 illustrating additional stages of operation of the clamping unit.

When a fresh charge has been prepared by the injector 44, it is ejected through the orifice 48. Since the die cavity 64B contains a charge, the injected melt will be diverted to the die cavity 64A, as shown in FIG. 10.

Figure 11:
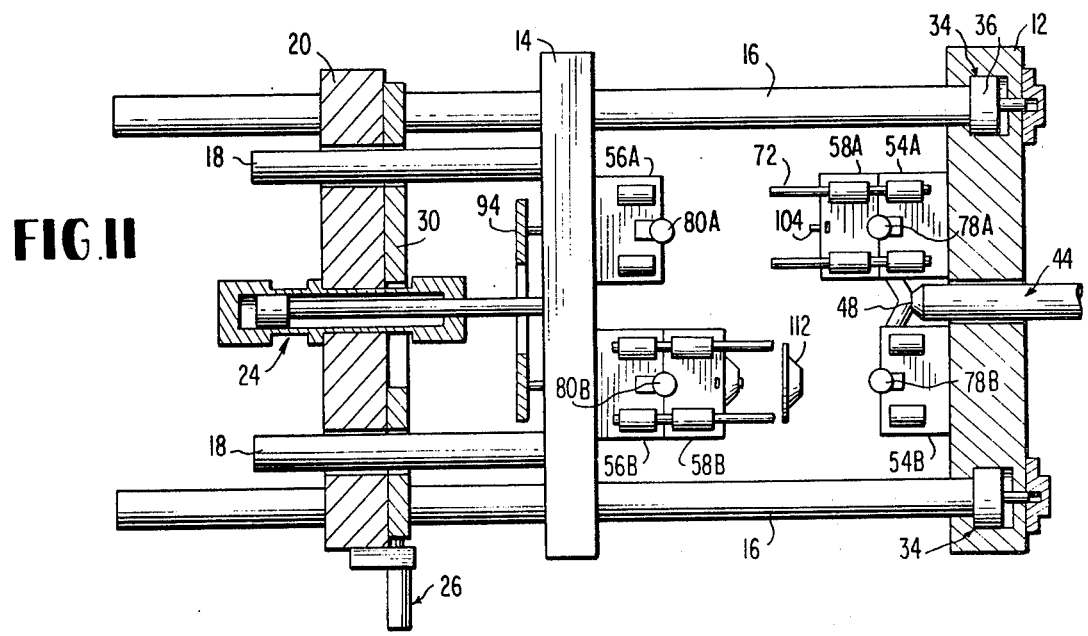

Subsequent to the filling of the die cavity 64A, both die cavities remain closed until the charge in the die cavity 64B has cured to the desired degree. With the hydraulic circuit of the coupling cylinders suitably actuated to couple together the floating and stationary die sections 58A and 54A, as well as the floating and movable die sections 58B and 56B, the clamp 10 is opened in the same manner as previously discussed to expose the die cavity 64B. When the movable platen 12 reaches its fully withdrawn position, the ejector pins 96 depress the ejector rods 104 in the floating die section 58B to eject the cured article 112, as shown in FIG. 11.

From this point, the molding cycle is continued from the stage described in connection with FIG. 1. It will be appreciated, however, that there is no longer a need for a sprue plug 70, since the curing charges disposed within the die cavities will function to suitably divert melt which is discharged from the injector 44.

As will be apparent from the foregoing discussion, the production rate of the multi-die clamp according to this invention is greater than that of a conventional single-die clamp. Significantly, this advantage is accomplished without necessitating increases in either clamp tonnage or injector capacity requirements.

Accordingly, the injector need only be of a size sufficient for producing charges of melt to inject a single die cavity.

Hence, neither the tonnage requirements of the clamp nor the charge capacity of the injector are increased.

Specifically, since the die cavities are injected independently and since the power cylinders 34 are common to the die assemblies, the clamp is required to develop tonnage sufficient to resist pressures accompanying the injection of only one die cavity.

Since during the curing and ejecting stages of an initially-injected charge, the clamp receives and partially cures a second charge, the production rate of the clamp will be significantly increased.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In molding apparatus of the type in which material is injected into die cavity means and allowed to remain in said die cavity means for an interval, and then the molded material is removed from the die cavity means, the improvement comprising:
a stationary platen;
a movable platen movable toward and away from said stationary platen,
a plurality of die assemblies each including a floating die section and an associated stationary die section, the proximate faces of which being configured so as to define therebetween a mold cavity;
said stationary die sections being mounted on said stationary platen;
connecting means releasably connecting said floating die sections to said movable platen, and releasably connecting said floating die sections to said associated stationary die sections;
power means operatively associated with said movable platens for moving said movable platen away from said stationary platen to:
separate the die sections of one of said die assemblies whose floating die section is released from its associated stationary die section and connected to said movable platen, and
move away from another of said die assemblies whose floating die section is disconnected from said movable platen and connected to its associated stationary die section, and
injector means common to a plurality of die cavities of said die assemblies so as to be selectively communicable therewith for selectively injecting material therein;
said injector means including a stationary barrel having an outlet, and conduits communicating said outlet with said stationary die sections of said plurality of die cavities.

2. A molding apparatus comprising:
a stationary platen;
a movable platen;
first and second movable die sections mounted on said movable platen;
first and second stationary die sections mounted on said stationary platen;
first and second floating die sections respectively disposed between said first and second movable and stationary die sections;
said first floating and stationary die sections and said second floating and stationary die sections respectively defining first and second die cavities when in abutting relationship;
a plurality of first fluid-actuated coupling cylinders carried by said first die sections;
one of said first coupling cylinders being actuable to a coupling posture to couple said first floating die section with said first movable die section;
another of said first coupling cylinders being actuable to a coupling posture to couple said first floating die section with said first stationary die section;
a plurality of second fluid-actuated coupling cylinders carried by said second die sections;
one of said second coupling cylinders being actuable to a coupling posture to couple said second floating die section to said second movable die section;
another of said second coupling cylinders being actuable to a coupling posture to couple said second floating die section to said stationary die section;
a plurality of guide rods carried by at least one of each of said first and second die sections;
said guide rods being receivable in apertures carried by at least an adjacent one of each of said first and second die sections;
an injector unit, having rotatable and reciprocal screw means, communicating with said first and second die cavities;
said screw, in response to forward rotation thereof, being operable to advance and plasticate molding material, and
screw, in response to forward displacement thereof, being operable to inject plasticated material into alternate ones of said first and second die cavities;
fluid-actuated clamp cylinder means operatively associated with said movable platen for selectively moving said movable platen toward and away from said stationary platen to urge said first and second floating die sections into firm abutting relationship with their associated first and second stationary die sections and close said first and second die cavities; and
ejector means for displacing a molded article from said die cavities when the latter are exposed;
with said die cavities being closed by said clamp cylinder means, and with access to said first die cavity being blocked by material curing therein, said extruder is operable to inject extrudate into said second die cavity;
with said one of the first coupling cylinders, and said other of the second coupling cylinders, being in a coupling posture, said clamp cylinder means is operable to separate said first floating and stationary die sections to expose said first section for ejection by said ejector means, while material in said second die section cures; and
with said other of the first coupling cylinders, and said one of the second coupling cylinders being in a coupling posture, said clamp cylinder means is operable to separate said second floating and stationary die sections to expose said second die cavities for ejection by said ejector means, while material in said first die cavity cures.

3. A molding apparatus comprising:
stationary frame means;
movable frame means;
at least two die assemblies, each die assembly including a pair of die sections;
each pair of said die sections being arranged to define a cavity when in abutting relation;
said die cavities being operable to receive a charge of plasticated material;
injector means communicating with said die cavities for selectively injecting material therein;
power means, common to said die assemblies, for exerting force to simultaneously clamp together the die sections of said die assemblies during insertion of a charge of plasticated material, and releasing such clamping force simultaneously from the die sections of said die assemblies;

said movable frame means being common to said die assemblies and being arranged to transmit clamping forces from said power means simultaneously to said die assemblies;

said stationary frame means carrying one of the die sections of each of said die assemblies so that such carried die sections constitute stationary die sections; the other die section of each die assembly being displaceable relative to said stationary die sections so as to constitute floating die sections;

means for coupling a floating die section of one of said die assemblies to said movable frame means when the die sections of said last-named die assembly are rendered relatively displaceable;

maintaining means, including means coupling the floating die section of one of said die assemblies to its respective stationary die section, maintaining the die sections of said one of said die assemblies in abutting relationship while the die sections of another die assembly are rendered relatively displaceable, when said power means is in a force-releasing mode; and maintaining means, including means coupling the floating die section of said other die assembly to its respectively stationary die section, maintaining the die sections of said other die assembly in abutting relationship while the sections of said one die assembly are rendered relatively displaceable, when said power means is in a subsequent force-releasing mode.

4. A molding apparatus comprising:

at least two die assemblies, each die assembly including a floating die section and a stationary die section;

each of said floating and stationary die sections being arranged to define a die cavity when in abutting relation;

injector means communicating with said die cavity for injecting a charge of plasticated material into said die cavity power means, common to said die assemblies, for exerting force to simultaneously clamp together the floating and stationary die sections of said die assemblies to resist injecting forces, and releasing such clamping force simultaneously from the floating and stationary die sections of said die assemblies;

means maintaining the floating and stationary die sections of one of said die assemblies in abutting relationship, while the floating and stationary die sections of another die assembly are rendered relatively movable, when said power means is in a force-releasing mode; and means maintaining the floating and stationary die sections of said other die assembly in abutting relationship while the floating and stationary die sections of said one die assembly are rendered relatively movable, when said power means is in a subsequent force-releasing mode.

5. A molding apparatus according to claim 4 wherein said injecting means comprises an injector unit common to said die cavities to supply plasticated material to alternate ones thereof.

6. A molding apparatus according to claim 4 and further including movable frame means, common to said die assemblies, arranged to transmit clamping forces from said power means simultaneously to said die assemblies; and means for coupling said floating die section of one of said die assemblies to said movable frame means when the die sections of said last-named die assembly are rendered relatively movable.

7. A molding apparatus according to claim 6 and further including stationary frame means carrying said stationary die sections of each of said die assemblies.

8. A molding apparatus according to claim 7 wherein said maintaining means comprises at least one fluid-actuated locking cylinder associated with each of said die assemblies, said cylinder including an extendable and retractable locking dog for engaging and releasing portions of said floating and stationary die sections.

9. A molding apparatus according to claim 8 wherein said movable frame means includes a further pair of die sections associated with said pair of die assemblies, said further pair of die sections constituting movable die sections; the locking cylinders being carried by said movable and stationary die sections and having tapered recesses in the locking dogs thereof for engaging tapered lug portions of said die sections.

10. A molding apparatus according to claim 9 wherein each die assembly further includes guide rod means carried by at least one of said die sections; said projection means projecting toward and being receivable in aperture means carried by at least an adjacent die section.

11. The mold apparatus of claim 10 wherein said guide rod means comprises a plurality of guide rods carried by said floating die section and being receivable in apertures carried by said movable and stationary die sections.

12. In molding apparatus of the type in which material in injected into die cavity means and allowed to remain in said die cavity means for an interval, and then the molded material is removed from the die cavity means, the improvement comprising:

first and second frame members arranged for relative movement toward and away from one another;

at least first and second die assemblies disposed between said first and second frame members in side-by-side relation so as to be spaced in a direction transverse to the direction of relative movement between said frame members;

each die assembly including a mating die section and a floating die section, the proximate faces of which being configured so as to define therebetween a closed mold cavity when said die sections are disposed in abutting relation;

said floating die sections being movable relative to one another;

the mating die section of each die assembly being carried by one of said first and second frame members;

injector means communicating with said mold cavities of said first and second die assemblies for selectively injecting material therein;

coupling means coupling said floating die sections selectively to either of said frame members to the exclusion of the other frame member;

said coupling means being arranged, while coupling a floating die section to the frame member which carries the mating die section associated with said last-named floating die section, to lock said die sections together in abutting relationship so as to maintain said mold cavity closed; and power means operatively associated with said frame members for moving said frame members relatively toward and away from one another such that:

with said floating die section of said first die assembly being coupled to said one frame member and uncoupled from said other frame member, and with said floating die section of said second die assembly being coupled to said other frame member and uncoupled from said one frame member, separation of said frame members by said power means causes the mold cavity of said second die assembly to be opened for removing material therefrom, with the mold cavity of said first die assembly being maintained in a closed condition for retaining material therein; and with said floating die section of said first die assembly being coupled to said other frame member and uncoupled from said one frame member, and with said floating die section of said second die assembly being coupled to said one frame member and uncoupled from said other frame member, separation of said frame members by said power means causes said mold cavity of said first die assembly to be opened for removing material therefrom, with said mold cavity of said second die assembly being maintained closed for retaining material therein; and with said first and second frame members being moved toward one another so that said first and second mold cavities are clamped closed by said power means, an empty one of said mold cavities may be supplied with material while material being carried by the other mold cavity cures.

13. Molding apparatus according to claim 12 wherein said mating die sections are mounted so as to be stationary.

14. A molding apparatus comprising:
first and second relatively movable frame means;
a first die assembly including a pair of die sections arranged to define a closed first die cavity when in abutting relationship, said closed die cavity being operable to hold a charge of plasticated material;
one die section of said first die assembly comprising a first mating die section carried by one of said frame means;
the other die section of said first die assembly comprising a floating die section capable of being;
coupled to said one frame means carrying said first mating die section and uncoupled from the other frame means wherein said first mating die section and said first floating die section are in abutting relationship to define said closed first die cavity, and
coupled to said other frame means and uncoupled from said one frame means carrying said first mating die section so as to be out of abutting relationship with said first mating die section such that said first die cavity is opened for ejecting cured material therefrom;
a second die assembly including a pair of die sections arranged to define a closed second die cavity when in abutting relationship, said closed second die cavity being operable to hold a charge of plasticated material;
one die section of said second die assembly comprising a second mating die section carried by one of said frame means;
the other die section of said second die assembly comprising a second floating die section capable of being:
coupled to said one frame means carrying said second mating die section and uncoupled from the other frame means wherein said second mating die section and said second floating die section are in abutting relationship to define said closed second die cavity, and
coupled to said other frame means and uncoupled from said one frame means carrying said second mating die section so as to be out of abutting relationship with said second mating die section such that second die cavity is opened for ejecting cured material therefrom;
said first floating die section being movable relative to said second floating die section;
injector means communicating with said first and second die cavities for selectively injecting material therein;
power means operatively associated with said frame means for:
shifting said first and second frame means relatively toward one another such that said die sections of said first and second die assembly are clamped in abutting relationship, said power means being arranged to exert sufficient clamping force to resist forces occurring during the insertion of plasticated material into one of said die cavities, and
shifting said first and second frame means to a separated position;
coupling means being arranged, with said first and second frame means being in a separated position for:
maintaining said first floating die section coupled to the frame means carrying said first mating die section and uncoupled from the other frame means, wherein said first die cavity is closed to allow uncured material therein to cure, and
simultaneously maintaining said second floating die section uncoupled from the frame means carrying said second mating die section and coupled to the other frame means so that said second die cavity is opened for the removal of cured material therefrom; and
said coupling means being further arranged, with said first and second frame means being in a subsequent separated position, for:
maintaining said first floating die section uncoupled from the frame means carrying said first mating die section and coupled to the other frame means sso that said first die cavity is opened for the removal off cured material therefrom, and
simultaneously maintaining said second floating die section coupled to the frame means carrying said second mating die section and uncoupled from the other frame means, wherein said second die cavity is closed to allow uncured material therein to cure.

15. Molding apparatus according to claim 14 wherein said first and second mating sections are disposed between said first and second frame means in side-by-side relation so as to be spaced in a direction transverse to the direction of relative movement between said frame means.

16. Molding apparatus according to claim 15 wherein said first and second mating die sections are mounted so as to be stationary.

17. Molding apparatus according to claim 14 wherein said first and second mating die sections are mounted so as to be stationary.

* * * * *